(12) United States Patent  (10) Patent No.: US 8,667,258 B2
Prasky et al.  (45) Date of Patent: Mar. 4, 2014

(54) HIGH PERFORMANCE CACHE TRANSLATION LOOK-ASIDE BUFFER (TLB) LOOKUPS USING MULTIPLE PAGE SIZE PREDICTION

(75) Inventors: Brian R. Prasky, Wappingers Falls, NY (US); Gregory W. Alexander, Pflugerville, TX (US); James J. Bonanno, Wappingers Falls, NY (US); Aaron Tsai, Poughkeepsie, NY (US); Joshua M. Weinberg, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 12/821,723

(22) Filed: Jun. 23, 2010

(65) Prior Publication Data

US 2011/0320789 A1  Dec. 29, 2011

(51) Int. Cl.
*G06F 7/38* (2006.01)
*G06F 9/00* (2006.01)
*G06F 9/44* (2006.01)
*G06F 9/26* (2006.01)
*G06F 9/34* (2006.01)

(52) U.S. Cl.
USPC .......................................... 712/238; 711/205

(58) Field of Classification Search
None
See application file for complete search history.

(56) References Cited

U.S. PATENT DOCUMENTS

| 5,179,715 | A * | 1/1993 | Andoh et al. ................. 718/100 |
| 6,079,003 | A * | 6/2000 | Witt et al. ...................... 711/200 |
| 7,089,398 | B2 | 8/2006 | Zhang |
| 7,100,018 | B2 | 8/2006 | Zhang et al. |
| 7,284,112 | B2 * | 10/2007 | Bradford et al. ............. 711/206 |
| 7,370,174 | B2 | 5/2008 | Arizpe et al. |
| 7,509,472 | B2 | 3/2009 | Caprioli et al. |
| 7,739,477 | B2 * | 6/2010 | Bradford et al. ............. 711/206 |
| 2006/0015706 | A1 | 1/2006 | Lai |
| 2006/0101299 | A1 | 5/2006 | Chung |
| 2007/0113158 | A1 | 5/2007 | Fischer |
| 2008/0114940 | A1 | 5/2008 | Ito |
| 2009/0070545 | A1 | 3/2009 | Stecher |
| 2009/0217002 | A1 | 8/2009 | Bonanno et al. |
| 2009/0217016 | A1 | 8/2009 | Bonanno et al. |

* cited by examiner

*Primary Examiner* — Andrew Caldwell
*Assistant Examiner* — William B Partridge
(74) *Attorney, Agent, or Firm* — Cantor Colburn LLP; John Campbell

(57) ABSTRACT

A computer processing system method and apparatus having a processor employing an operating system (O/S) multi-task control between multiple user programs and which ensures that the programs do not interfere with each other, said computing processing system having a branch multiple page size prediction mechanism which predicts a page size along with a branch direction and a branch target of a branch for instructions of a processing pipeline, having a branch target buffer (BTB) predicting the branch target, said branch prediction mechanism storing recently used instructions close to the processor in a local cache, and having a translation look-aside buffer TLB mechanism which tracks the translation of the most recent pages and supports multiple page sizes.

20 Claims, 7 Drawing Sheets

HIGH PERFORMANCE CACHE TRANSLATION LOOK-ASIDE BUFFER (TLB) LOOKUPS USING MULTIPLE PAGE SIZE PREDICTION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer processing systems, and particularly to for high performance cache translation look-aside buffer (TLB) lookups using multiple page size prediction.

2. Description of Background

The design of an I-cache for a system that supports virtual memory where the I-cache represents a subset of the overall memory and is not virtually tagged traditionally requires a directory and translation look-aside buffer (TLB) to perform the cache lookup. The TLB is responsible for caching the virtual to absolute/effective address translation results and the directory provides the tagging for determining if the data identified by the absolute/effective address is contained within the cache (hit or miss). A page size of an architecture that supports virtual memory defines how many bits of the virtual address are equivalent to the absolute/effective address (no translation is required). When architectures were initially defined, memory requirements of a computer were much smaller than they are today. As such, the page size requirements of yesterday are not the same as the page size requirements of today. Larger page sizes are going to be used because they provide the advantage of less page management by software and less TLB misses for TLBs that support the larger page size. This is desirable for programs which can handle pages which are large enough in size to leverage the memory allocation defined by a large page. However, manufacturers, like IBM, generally desire to support the older legacy programs as well as to provide machines which can handle larger pages and current programs. So there is a need to support multiple page sizes to meet customer demands.

There are multiple ways to address the concern of supporting multiple page sizes. Multiple TLBs where each TLB is with respect to a different page size, Content Addressable Memory implementations, have been proposed, but none have provided a fully acceptable solution.

SUMMARY OF THE INVENTION

The current invention illustrates how to effectively apply a single TLB that supports multiple page sizes. We show this with respect to a system, such as an IBM mainframe, which has multiple microprocessors and where each microprocessor supports two page sizes. This current invention supports multiple page sizes while maintaining performance, area, and power and providing optimal utilization of the silicon space allocated to the TLB storage.

In accordance with the invention a single TLB is provided which supports multiple page sizes when a branch target uses different paging.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution which provides a method for fault injection verification as a computer process without manual intervention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
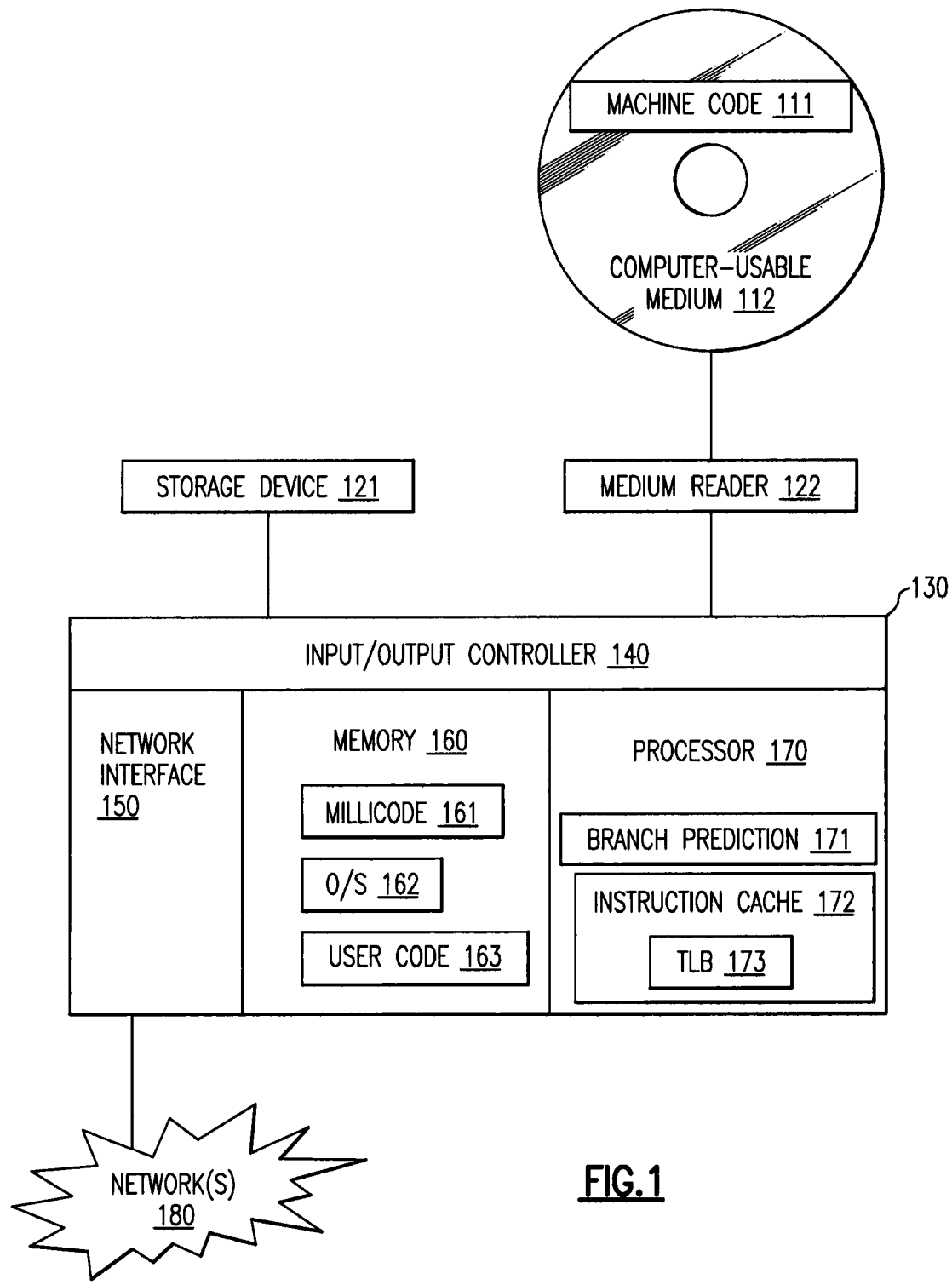
FIG. 1 illustrates the exemplary embodiment of our computing system and its hardware correlation of branch perdiciton and an instruction cache's TLB.

Turning now to the drawings in greater detail, it will be appreciated that in FIG. 1 there is illustrated the exemplary embodiment of our computing system and its hardware correlation of branch perdiction and an instruction cache's TLB.

A page size for an instruction fetch is most likely to change for one of two reasons. The first is there a branch to a function where the function is contained in a dynamically linked library where the library was compiled independent of the program that is calling the library. At different compiler times, different page sizes were used which thereby creates a caller and callee function which are applying different I-cache page sizes. The second is an interrupt comes in which changes the program status word (PSW) of the processor and upon changing where the processor is processing, the instruction image page size also changes. This invention is targeted at the first scenario which can be predicted ahead of time thereby utilizing a single set associative TLB while keeping frequency, power, and area in line with a set associative TLB of total equal capacity for a single page size.

The prediction of a page size would be collate with branches in the branch prediction logic. When a branch and its target is predicted, in addition to predicting the target of a branch, the page size of the target will also be predicted.

The advantage to having a larger page size is to reduce the amount of TLB misses on programs which have method footprints which leverage the memory allocated by a large page.

This invention support can be provided to legacy small pages and current large pages without impacting frequency, and very minimal impact to area and power for all page sizes supported.

So, our new design addresses how to associate post branch content (target page) with that of the branch. This enables a single TLB to supports multiple page sizes, such as the illustrated 4 k and 1 megabyte page sizes of an IBM mainframe.

Now, a page size can change for several reasons, including the one illustrated where the branch target uses a different paging (i.e. 4 k vs 1 meg), as well as other reasons such as when processor takes an interrupt handler and the interrupt goes to a new page or goes into an area with a different page size.

FIG. 1 illustrates the computer system having branch target buffer (BTB) hit detect logic of an exemplary embodiment of the invention and how that content is used to access the TLB. The computer itself is denoted by 130. Within the computing system there is the input/output controller (140) which communicates with the storage devices (121), drives and interfaces of the medium reader (122) for reading user data medium (112) which contains our machine code and data (111). The computing system can also acquire content from a network (180) via the network interface (150). This content is stored in local memory (160). Beyond user data, there is significant code required to make the computer and user program run. There is the internal millicode (161). The millicode is part of the architected instructions. The complex instructions are defined as a single instruction; however, there is internally licensed code which breaks one complex instruction into many less complex instructions. The purpose of millicode is two fold. Having full control over the hardware it contains algorithms that have been designed and tested specifically for the machine. These algorithms with the control they have over the system could crash a system if not done correctly. It is for this reason that a complex instruction is given to the user and the "delicates" are handled within the tested routine. It is with this level of control that derives the second reason. This control allows certain operations to be performed faster than what a programmer on the system can accomplish because of the control difference the internally licensed millicode has over an end user. The operating system (162) specifically relies on millicode internal control as the O/S mutli-task between multiple user programs (163) and must ensure that the programs do not interfere with each other. These levels of software (162, 163) run on the processor (170). To bring highly recently used instructions close to the processor content is stored in a local cache (172). Given the finite size of the local cache (172), a TLB (173—Translation Look-aside Buffer) tracks the translation of the most recent pages. The translation is between the virtual address of a user's program to the form the content is addressed within memory. These levels of translation are required for each program is written independent of any other program and while the programs may reference the same [virtual] addresses, they are not allowed to interfere with each other's memory/data. When running a program, there are many decision points/branches that are encountered in the program. On average, such a decision is to be made every 4 to 5 instructions on average. If the program had to wait for each branch to be resolved prior to making future progress the computing systems would run slow as there would be minimal opportunity to overlap the processing of multiple instructions. To allow the overlapping of instructions branches must be predicted (171) as to what there outcome will be such that the processor does not stall awaiting for the outcome of a branch.

Figure 2:
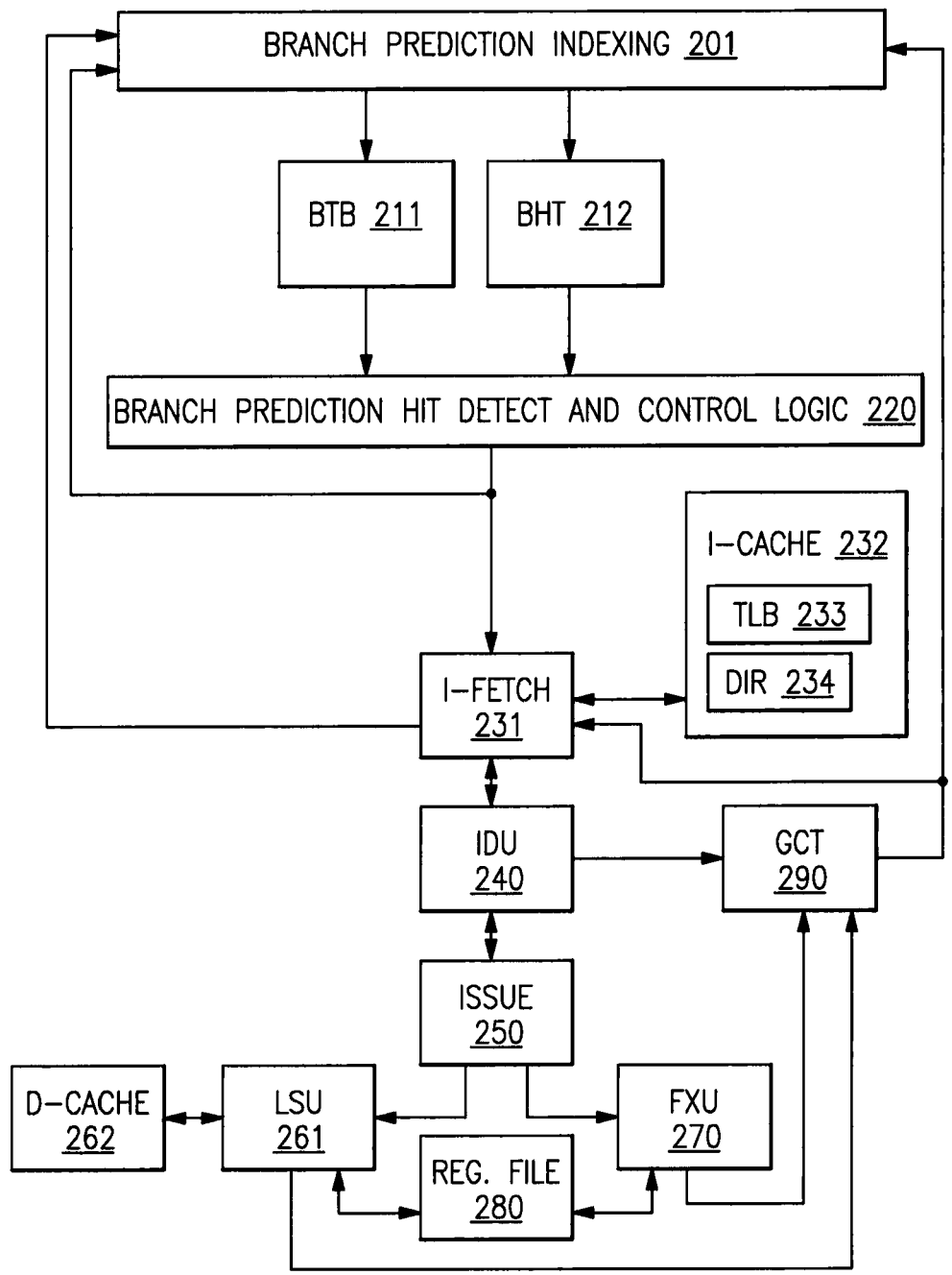
FIG. 2 illustrates branch target buffer (BTB) and branch prediction logic.

Accordingly, FIG. 2 shows the general flow of a microprocessor pipeline. When fetching for an instruction (231), upon the initial fetch, the I-cache (232) is accessed and the branch prediction unit is indexed at a branch prediction index (201). The branch prediction unit accesses the branch target buffer (BTB 211) to determine address of the next future branch along with the target of the branch and the page size that the target references. The branch history table (BHT 212) provides the direction guess of the branch (taken vs not taken). Upon detecting a hit with the branch prediction hit detect and control logic (220), if the branch is taken the I-fetch (231) fetches the target of the branch from the I-cache (232). Additionally, the target is sent back to the BTB branch prediction index (201) as to start searching for the next branch with respect to the target address locality. When making a fetch to the I-cache (232) a translation look-aside buffer (TLB 233) and a directory (234) are accessed. With the defined architecture, there is a defined page size. The page size states how many of the least significant bits of the virtual addressed program code equals those address bits to reference memory. Over time as memory has increased, page sizes have also increased. If a program or section of a program is larger than a page, then the memory is not efficiently being utilized. Therefore, as memory has increased the page size is also advantageous to increase. Increasing the page size states a given number of entries in a TLB can support a larger memory footprint for address translation. Beyond having the translation locally available at the TLB (233), the I-cache must also have the content local. This content is tracked in the directory (234). After fetching the instruction text, the instruction text is sent to the instruction decode unit (240—IDU) to allow the instructions to be decoded such that the processor knows how to operate on each instruction. The instructions are sent to an issue queue (250) which determines when the instructions can be sent to the appropriate unit to perform the operation of the instruction. Instructions may not be issued right away as an instruction may be dependent on an older instruction which has yet to resolve. The LSU (261) processes instructions that deal with memory and this memory is kept locally as much as possible in the D-cache (262). The D-cache has a directory and TLB similar to the I-cache's TLB (233) and directory (234). Addresses to index the D-cache are a function of local registers. These registers can be accessed by both the load store unit (LSU 261) and fixed point unit (FXU 270). The FXU (270) performs data computations on the registers. Upon the LSU (261) and FXU (270) completing instructions, this is tracked in the Global Completion Table (290—GCT). Should a branch resolve with the wrong predicted target or direction, the I-fetch (231) and branch prediction (201) must be restarted.

The concept of branch prediction logic uses a branch history table (BHT) and potentially a branch target buffer (BTB). The BHT predicts the direction (taken versus not taken) of a branch while a BTB predicts the address of where a branch is found in addition to predicting the target of a branch. This invention adds a page size state to the BTB entries. A BTB typically contains information about a branch, which includes the target address of the branch. A BTB does not typically contain information about its target. In other words, an entry in the BTB contains information acquired from resolving a branch and the target of a branch does not have to be understood/fetched/executed in order to write the branch entry into the BTB. In order to write the page size of a branch target into the BTB, a correlation has to be established between the branch and its target such that upon installing a branch into the BTB, the target page can also be set appropriately.

Without guaranteeing that a branch target has been processed at all, upon installing the branch into the BTB, a default state needs to be applied should information not have been gathered about the page size of the branch target. The means to collate the page size of the branch target to that of the branch is by the means of instruction address registers (IA-regs).

Each unique cache line fetch request to the I-cache acquires an IA-reg (see Instruction Address register FIG. 5) and this IA-reg is tracked through the entire processor pipeline. With each branch in the pipeline, there is an IA-reg tracked for both the branch address and the target address. It is with this target IA-reg that the page size information is also tracked. When installing a branch into the BTB, the branch and target IA-reg must be accessed to acquire the branch and target address which is to be stored into the BTB. Also when accessing the target IA-reg, it is evaluated as to the page size of the target.

Should the target not have yet been fetched, then the default initialization of the page size for the given IA-reg is a used. The default allocation for the target page size is the page size of the branch itself.

When a branch is predicted taken, beyond acquiring the target address for the branch target, the BTB reports the page size that the target fetch is to use for making instruction fetches (I-fetches). This page size is assigned to an IA-reg along with assigning the cache line address to an IA-reg. Whenever a fetch is made via the I-fetch logic to the I-cache, it is determined which IA-reg is being used to generate the fetch address. Along with the address from the IA-reg is the page size. This page size determines the least significant bits (LSB) of the address bits that are translated, and a certain number of these translated bits (beginning with the least significant) are used to index the I-cache TLB.

Should a TLB miss for the predicted page size take place, then the TLB is reindexed (at a later time) with the opposing page size index in case the page size prediction was incorrect. If a hit is acquired on the opposing page size, then reported back to the I-fetch logic is a correction that the page size associated with an IA-reg is incorrect and the page size associated with the given IA-reg is updated to reflect the proper page size. If there is also a miss on the opposing page size, then there is a complete TLB miss and the I-cache will allow the virtual address translation process to proceed. At completion of the translation process, the I-cache will compare the translation result page size against the originally predicted page size. If the predicted page size was incorrect, then this another situation in which a page size correction is reported back to the I-fetch and branch prediction logic for appropriate update actions.

In the case the page size was determined from a predicted branch where the predicted page size was incorrect, then the branch acquires a tracking bit that states the page size of the given branch's BTB entry is to be updated upon completion of the given branch.

Figure 3:
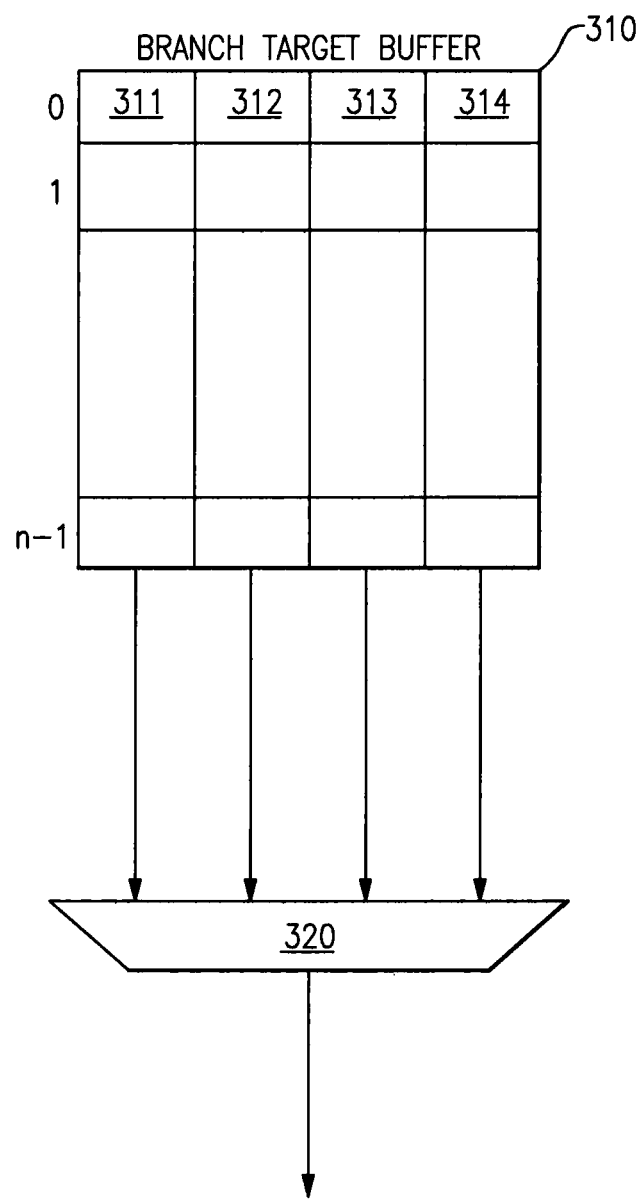
FIG. 3 shows the predicted branch's target address dataflow.

In the exemplary embodiment, FIG. 3 shows the predicted branch's target address dataflow utilized by our branch multiple page size prediction mechanism such that when a branch and its target is predicted, in addition to predicting the target of a branch, the page size of the target will also be predicted. This FIG. 3 shows the BTB (310) containing 4 sets of data (311, 312, 313, 314) upon which a target can be predicted from any of the 4 BTB sets. Each set has the potential of stating the target address of the branch as that of the address contained in the BTB. Upon determining which address is to be used per BTB set with respect to predicting a branch target, the BTB (310) must have its output muxed (320) down to a single branch as the next branch in program order which will be predicted. The selection of BTB target (311, 312, 313, 314) is shown in FIG. 4.

Figure 4:
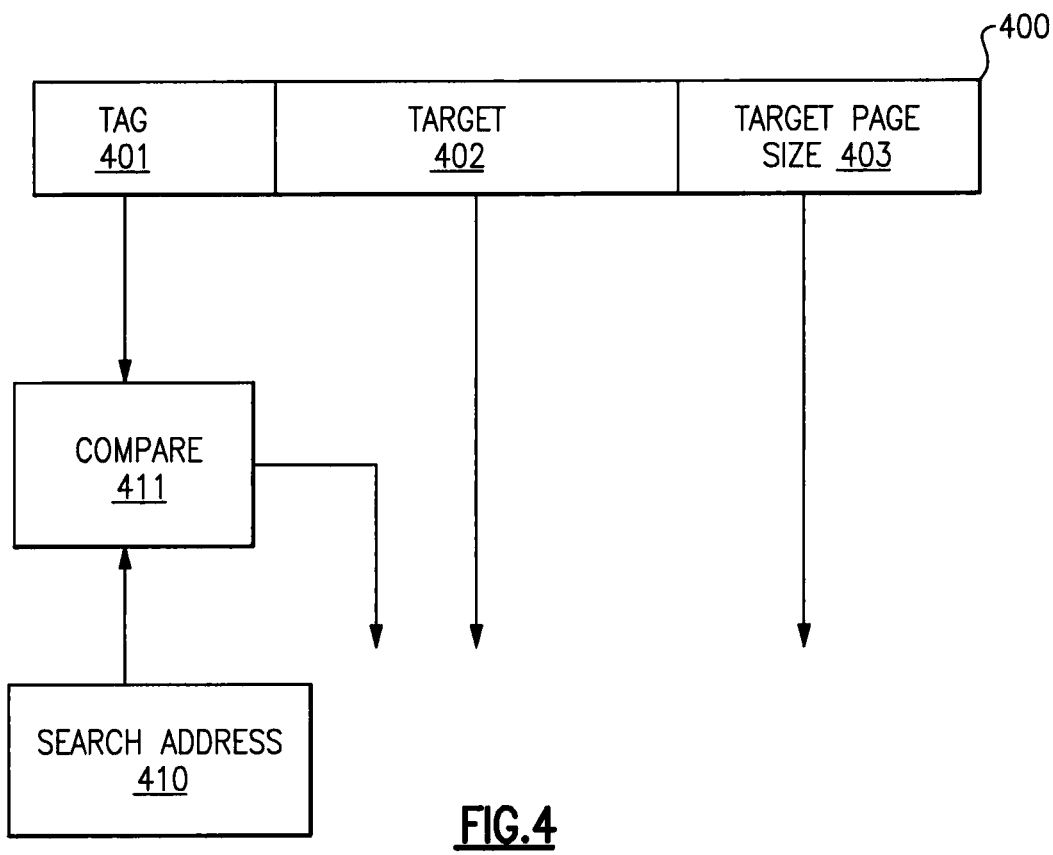
FIG. 4 shows the branch target buffer's (BTB) target address selection steps.

FIG. 4 illustrates a branch target buffer's (BTB) target address selection steps. Per a given BTB entry (311, 312, 313, 314) multiple blocks of data are stored with each entry. In FIG. 4, the BTB entry (400) contains at minimal a branch tag address (401), a predicted target address for the given branch (402

Figure 5:
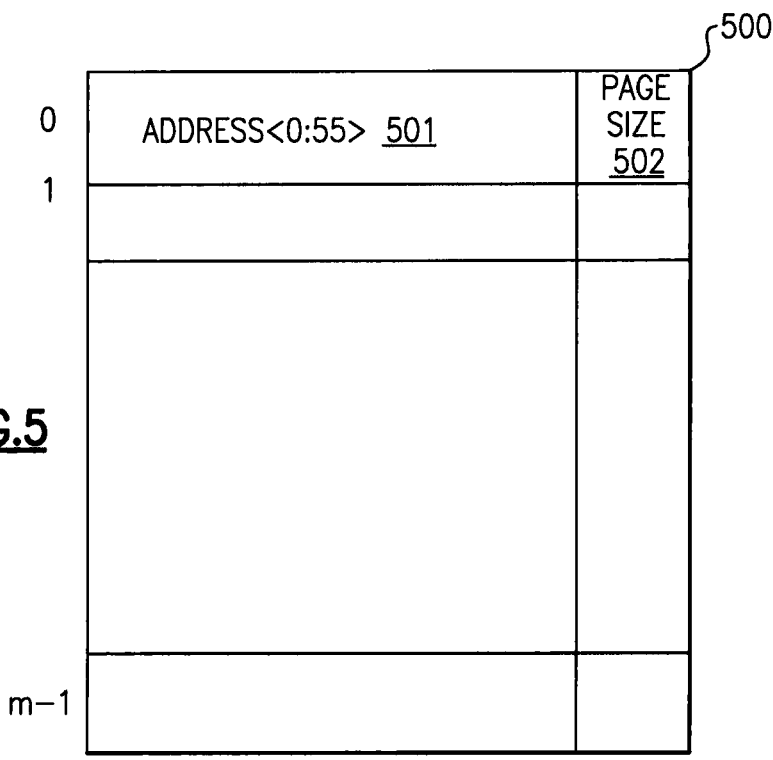
FIG. 5 illustrates the IA-regs (Instruction Address registers).

FIG. 5 illustrates the IA-regs. When an I-fetch is made to the I-cache, the cache line virtual instruction address is desirably tracked throughout the entire pipeline, but it is very area consuming to track this entire address throughout the entire pipeline. In this embodiment, instead a limited number of cache lines are allowed to be in flight within the pipeline at any given time. These cache lines have the address 501 and page size 502 and are placed into a cache table 500 and then a table pointer or ptr is carried throughput the pipeline so as to be able to later reference the entire instruction address of a given instruction.

Figure 6:
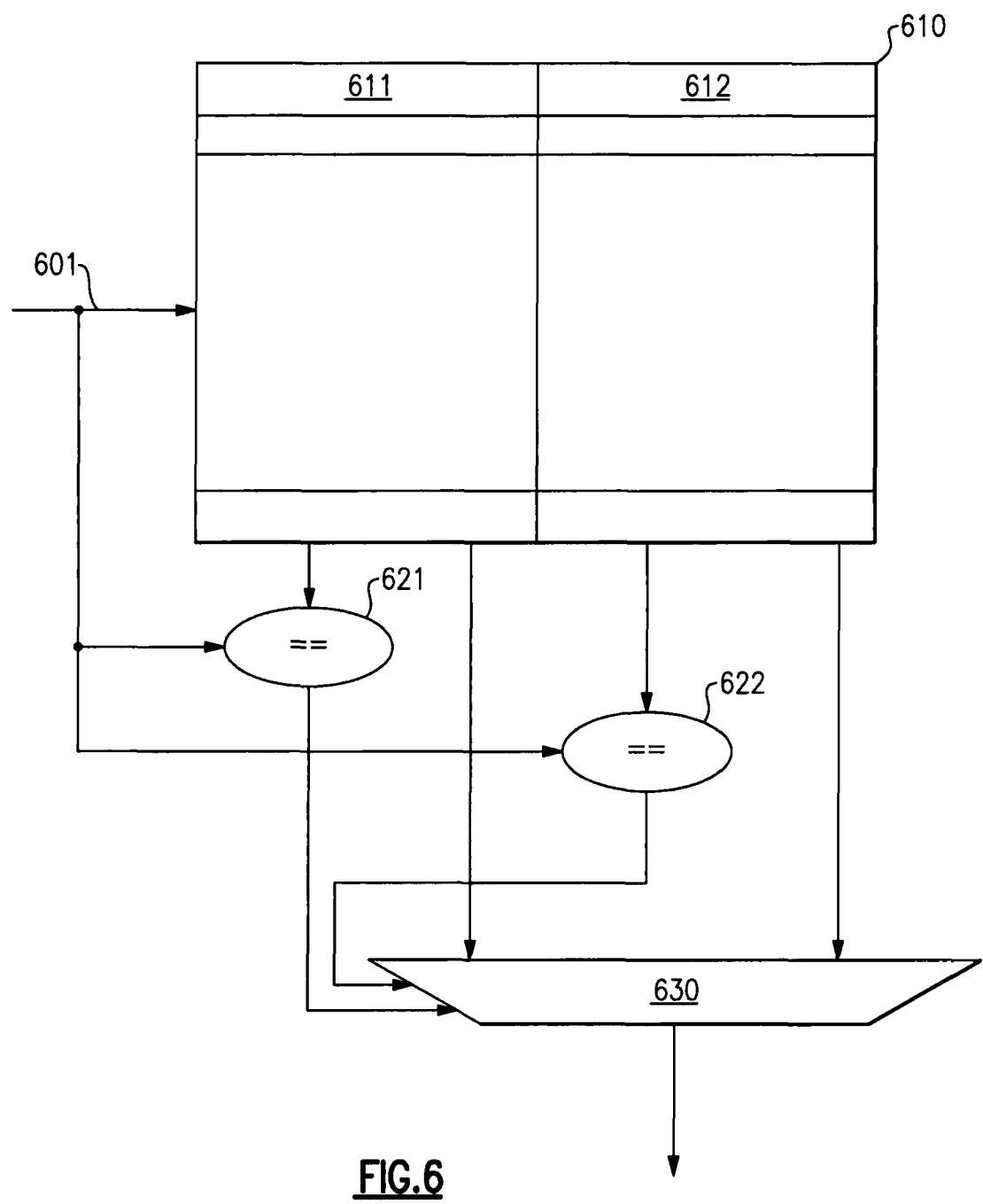
FIG. 6 illustrates the 2-way set associative TLB.

FIG. 6 illustrates the 2-way set associative TLB. Within each entry of the translation look-aside buffer TLB 610 there are two pieces of data. A tag is used for a first compare (621) against a first data set and provides the translated address. This first data set 611 represents these two pieces of data from one set and a second data set 612 represents this data from the other set. The index (601) into the TLB is limited in size because the TLB is finite. For this reason, the rest of the address forming the index is used for the tag first and second compares (621, 622). The results are provided to a translated address multiplexor 630. As page sizes have increased, the multiple page sizes must be handled in one manner or another. While in an alternative embodiment (not shown) individual TLBs could be created for each page size, this is an inefficient use of area and the illustrated examiner is able to store all translations in a single table which makes better use of area and allows for a lower latency.

Figure 7:
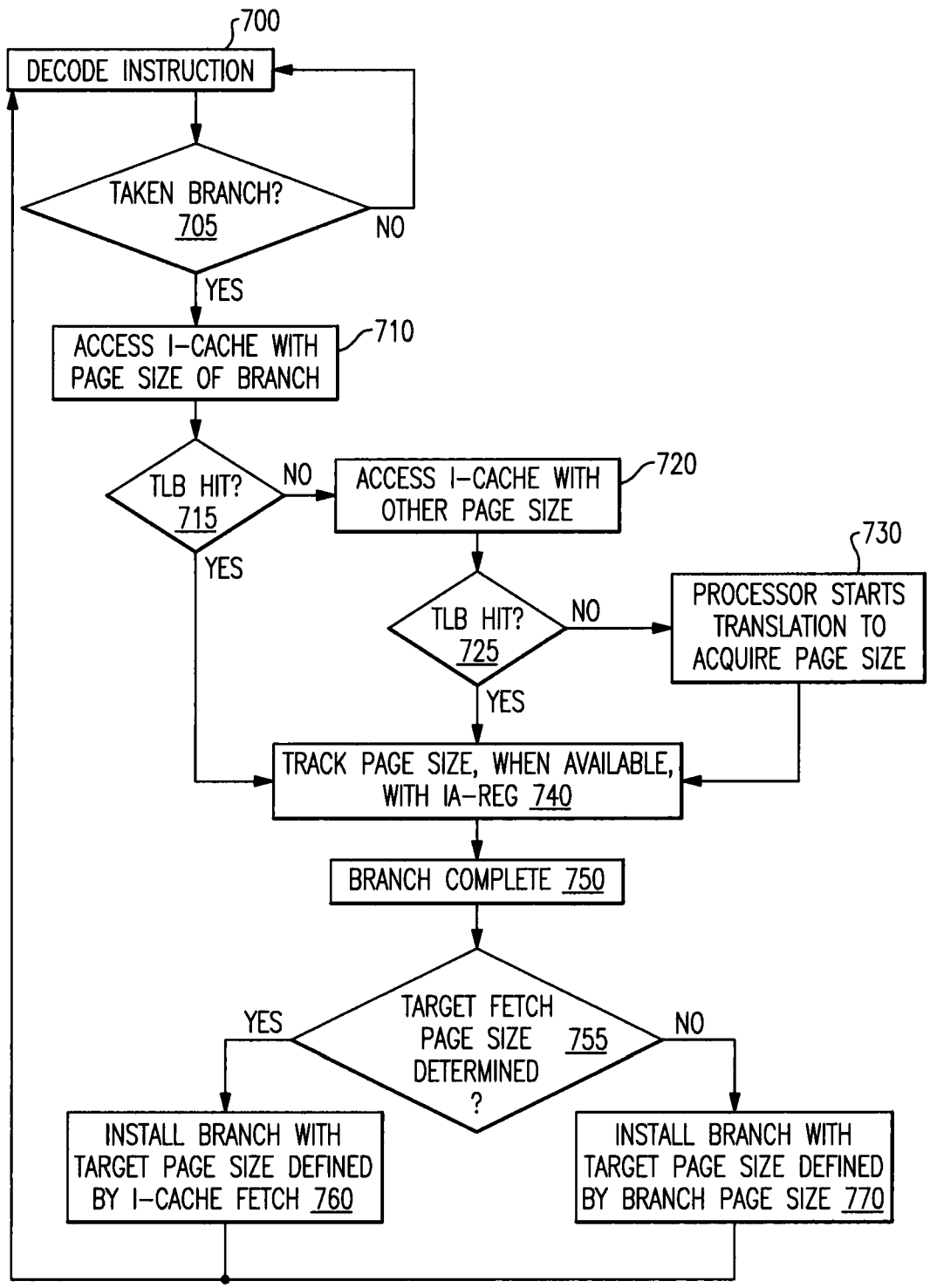
FIG. 7 shows the operation for a surprise taken branch.

FIG. 7 defines the operation for a surprise taken branch and how it is placed into the BTB (Branch Target Buffer) along with the page size of the branch's target. Upon decoding an instruction (700), the opcode is examined to determine if it is a branch. If it contains a branch prediction marking from the instruction fetch unit IFU then the branch is predicted (see FIG. 8). If the branch is not predicted, then the branch is classified as a surprise branch. The branch being classified as taken can occur at one of two time frames. The branch can be guessed and taken at the decode time frame as per the opcode or any other structure that exist to assist in defining a decode time frame direction guess. Secondly, the branch can be defined as resolving and taken as a function of executing the branch. At either of these points, upon computing the address target of the taken branch (705), an instruction fetch is made for the branch. The instruction fetch comprises accessing the I-cache directory and translation look-aside buffer TLB to determine if the content of interest is in the levell cache or not. For a TLB that supports multiple page sizes, the TLB must be accessed (710) with respect to some initial page size. The default page size used for fetching the branch target is to access the I-cache with the page size descriptor of that of the branch itself. If the TLB results in a hit (715), then it is known that the page size used for the target is the same as that of the branch. If the TLB results in a miss (715) then either the entry does not reside in the TLB or the TLB was accessed with respect to the incorrect page size. To determine which scenario is the case, the I-cache's TLB is accessed again (720), but this time an index which is used corresponds to the other page size. If this access results in a hit (725), then it is known that the page size of that of the branch target is different from that of the branch. This page size for the target is then to be tracked with the IA-reg address value, as maintained in the IA-reg, that address is tracked with the branch (740). If a miss still occurs in the TLB, then the translation for this address does not exist in the TLB and it remains unknown to the page size of the target address. Given the qualified TLB miss, a translation process must then be started (730) as to determine the translated address and page size of the target. When this translation becomes available, it is to be tracked (740) along with the branch. There is no restriction to completing and checkpointing the branch instruction (750) that requires the target fetch address to have completed its translation. If the target page size of the branch has been determined (755), then upon installing the branch into the BTB, the target page size of the given branch is set as per the TLB hit or resulting translation that occurred (760). If the TLB encountered a miss and the translation did not complete for the target of the branch at the time the branch is being checkpointed, then the page size of the target remains unknown and by default, the page size of the branch is defined to be the page size of the branch's target address (770). Should it later be determined that the target page size is resolved to be different [than that of the branch], it can be updated in the BTB entry as defined by FIG. 8. These processes may be pipelined.

FIG. 6 illustrates the 2-way set associative TLB. Within each entry of the translation look-aside buffer TLB 610 there are two pieces of data. A tag is used for a first compare (621) against a first data set and provides the translated address. This first data set 611 represents these two pieces of data from one set and a second data set 612 represents this data from the other set. The index (601) into the TLB is limited in size because the TLB is finite. For this reason, the rest of the address forming the index is used for the tag first and second compares (621, 622). The results are provided to a translated address multiplexor 630. As page sizes have increased, the multiple page sizes must be handled in one manner or another. While in an alternative embodiment (not shown) individual TLBs could be created for each page size, this is an inefficient use of area and the illustrated examiner is able to store all translations in a single table which makes better use of area and allows for a lower latency.

FIG. 7 defines the operation for a surprise taken branch and how it is placed into the BTB (Branch Target Buffer) along with the page size of the branch's target. Upon decoding an instruction (700), the opcode is examined to determine if it is a branch. If it contains a branch prediction marking from the instruction fetch unit IFU then the branch is predicted (see FIG. 8). If the branch is not predicted, then the branch is classified as a surprise branch. The branch being classified as taken can occur at one of two time frames. The branch can be guessed and taken at the decode time frame as per the opcode or any other structure that exist to assist in defining a decode time frame direction guess. Secondly, the branch can be defined as resolving and taken as a function of executing the branch. At either of these points, upon computing the address target of the taken branch (705), an instruction fetch is made for the branch. The instruction fetch comprises accessing the I-cache directory and translation look-aside buffer TLB to determine if the content of interest is in the level 1 cache or not. For a TLB that supports multiple page sizes, the TLB must be accessed (710) with respect to some initial page size. The default page size used for fetching the branch target is to access the I-cache with the page size descriptor of that of the branch itself. If the TLB results in a hit (715), then it is known that the page size used for the target is the same as that of the branch. If the TLB results in a miss (715) then either the entry does not reside in the TLB or the TLB was accessed with respect to the incorrect page size. To determine which scenario is the case, the Icache's TLB is accessed again (720), but this time an index which is used corresponds to the other page size. If this access results in a hit (725), then it is known that the page size of that of the branch target is different from that of the branch. This page size for the target is then to be tracked with the IA-reg. address value, as maintained in the IA-reg, that address is tracked with the branch (740). If a miss still occurs in the TLB, then the translation for this address does not exist in the TLB and it remains unknown to the page size of the target address. Given the qualified TLB miss, a translation process must then be started (730) as to determine the translated address and page size of the target. When this translation becomes available, it is to be tracked (740) along with the branch. There is no restriction to completing and checkpointing the branch instruction (750) that requires the target fetch address to have completed its translation. If the target page size of the branch has been determined (755), then upon installing the branch into the BTB, the target page size of the given branch is set as per the TLB hit or resulting translation that occurred (760). If the TLB encountered a miss and the translation did not complete for the target of the branch at the time the branch is being checkpointed, then the page size of the target remains unknown and by default, the page size of the branch is defined to be the page size of the branch's target address (770). Should it later be determined that the target page size is resolved to be different [than that of the branch], it can be updated in the BTB entry as defined by FIG. 8. These processes may be pipelined.

Figure 8:
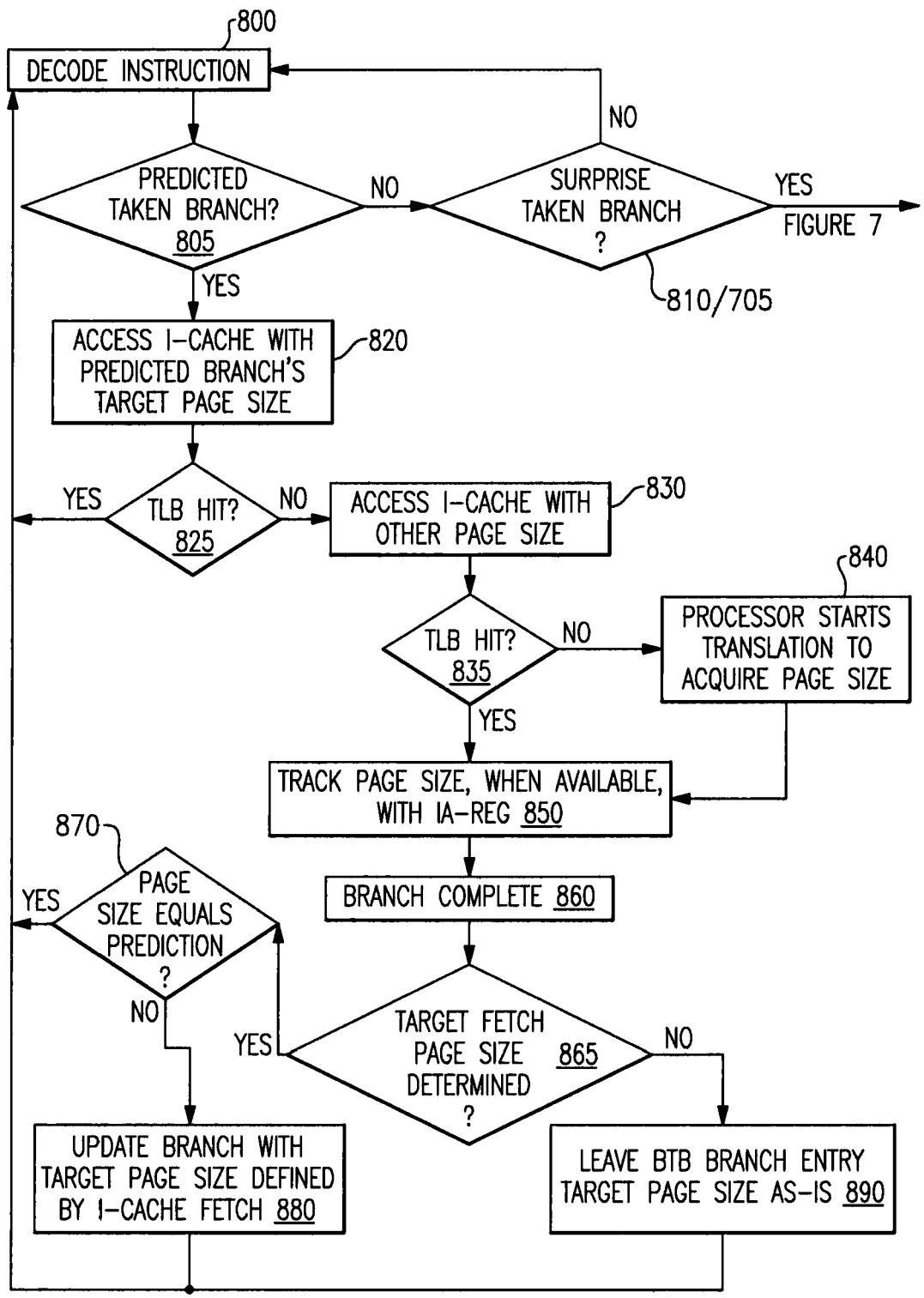
FIG. 8 the operation for a predicted taken branch.

FIG. 8 defines the operation for a predicted taken branch and how the predicted target's page size is applied and updated. Upon decoding an instruction (700), the opcode is examined to determine if it is a branch. If it contains a branch prediction marking from the IFU then the branch is predicted. This branch may either be predicted taken or not taken (805). If the branch is predicted not taken then it also been deemed to not be a surprise branch (810) and processing proceeds with the next instruction in the stream to be processed. If the instruction was not predicted (805) and was deemed to be a branch (810), it must be determined if the surprise (aka not predicted) branch is taken (810). If the branch is not taken, then the machine proceeds with the next instruction (800). If the branch is deemed to be a surprise taken branch (810), then the processing continues for the handling of a surprise branch as defined by FIG. 7. If the branch has been defined to be a predicted taken branch (805), then a fetch is made for the predicted target (820) with access to the TLB defined with respect to the predicted target's page size. If this target fetch yields a TLB hit (825) then the predicted page size is correct and processing is to continue with the next instruction (800). If a TLB miss is encountered (825), then either the entry does not exist in the TLB or the wrong page size was used with respect to the target accessing the TLB. In either case, it must be determined which scenario is the actuality. To determine this, a fetch is made again to the TLB; however, this time with respect to the opposing page size (830). If a TLB hit (835) then it is known that the page size predicted with that of the target is incorrect. If a miss to the TLB (835) also is encountered with the opposing page size index reference, then there is a miss in the TLB and it remains unknown as to the page size of the branch's target address. On such a miss, the entry does not exist in the TLB and a translation process on the target address must begin (840). Upon resolution of the target address page size (835 hit or 840), this target page size is to be tracked along with the branch (850). When the branch completes and the results are to be checkpointed (860), there is no requirement for the target page size to have been determined for the knowledge of the target address regarding its translation is not a dependency for the branch to complete (860). At the completion of the branch (860), updates are to be determined if they exist for the BTB entry. For this, it needs to be determined if the target page size has been resolved (865). If the target page size has not been resolved (865), then the BTB entry is to remain as-is for no further knowledge about the branch's target is know. If the page size has been determined (865) it then needs to be analyzed (870) to if the page size is the same or different than that of the predicted target's page size. If the predicted page size is equal to the resolved target page size, then the BTB predicted the correct page size for the target and no update to the BTB's entry for the predicted branch's target page size needs to be made (870 to 800 transition). If the predicted page size does not equal (870) the resolved page size of the branch's target, then the BTB's entry for the given branch is to be updated to reflect the resolved page size of the branch's target (880). To one skilled in the art, these processes may be pipelined.

The diagrams of the exemplary embodiment depicted are just examples. There may be many variations to these diagrams or the steps (or operations) described therein without departing from the spirit of the invention. For instance, the steps may be performed in a differing order, or steps may be added, deleted or modified according to the order of importance of the heuristic steps, in order to perform the described functions. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer processing system, comprising:
a computer processing system apparatus having a processor employing an operating system (O/S) configured for multi-task control between multiple user programs which ensures that the multiple user programs do not interfere with each other, said computing processing system comprising a branch multiple page size prediction mechanism which predicts a page size and a branch target of a branch for instructions of a processing pipeline of the computer processing system using a branch target buffer (BTB) configured to predict the branch target, said BTB storing recently used instructions close to the processor in a local cache; and
a translation look-aside buffer (TLB) configured to track translation of most recent pages translated by the computer processing system and that supports multiple page sizes based on branch targets that use different page sizes.

2. The computer processing system according to claim 1, the computer processing system further configured to use a page size for an instruction fetch having a different page size based on there being a branch to a function contained in a dynamically linked library; and
compile the library independently of the user program that is calling the dynamically linked library such that at different compiler times, different page sizes are used to create a caller function and a callee function which apply different page sizes; and
predict said different page sizes ahead of time utilizing a single set associative TLB.

3. The computer processing system according to claim 1, the computer processing system further configured to collate a prediction of a page size with branches in a branch prediction logic of the processor which is utilized by said branch multiple page size prediction mechanism such that, based on a branch and a target of the branch being predicted, the page size of the target is predicted.

4. The computer processing system according to claim 3, the computer processing system further configured to utilize a prediction of a page size for the branch prediction logic for the page predictor of the instruction fetch and the TLB, and track, along with content of a target address, a page size prediction in the branch multiple page size prediction mechanism such that based on a branch and a target of the branch being predicted, the page size of the target is predicted.

5. The computer processing system according to claim 4, the computer processing system further configured to collate a prediction of a page size with the page size of the branch target and
acquire by each unique cache line fetch request an instruction address registers address value which is tracked through the processing pipeline.

6. The computer processing system according to claim 5, the computer processing system further configured to track page size information of the instruction address registers address value;
based on installing a branch into the BTB, access the branch and instruction address registers address value to acquire the branch and target address to be stored into the BTB;
based on accessing the instruction address registers address value, evaluate the page size of the target; and
based on a branch being predicted as taken, acquire the target address for the branch target, and the BTB reports a page size that the target fetch uses for making instruction fetches and assigns the reported page size to an instruction address registers address value along with assigning a cache line to an instruction address registers address value such that, based on a fetch being made via instruction fetch logic to an instruction cache, it is determined which instruction address registers address value is being used to generate a fetch address which has the page size of the address, wherein the page size determines a least significant bits (LSB) of address bits that are translated, and wherein a certain number of these bits are used to index the TLB.

7. The computer processing system according to claim 5, wherein the TLB is a two-way set associative TLB within which for each entry of the TLB there are two pieces of data, and a tag is used for a first compare for a first data set which provides a translated address of the entry.

8. The computer processing system according to claim 5, the computer processing system further configured to decode an instruction and examine an opcode for the instruction to determine if the instruction is a branch, and based on the instruction comprising a branch prediction marking from the instruction fetch logic predict a target of the branch; and
based on the branch not being predicted, classify the branch as a surprise branch.

9. The computer processing system according to claim 8, the computer processing system further configured to, based on the branch being difined as a predicted taken branch, make a fetch for the predicted target by an access to the TLB defined with respect to the a page size of the predicted target; and
based on the fetch being a TLB hit determine that the page size of the predicted target is correct; and
process a next instruction by the processor.

10. A method for computer processing system control for a processor having operating system (O/S) multi-task control between multiple user programs, comprising:

predicting, by a branch multiple page size prediction mechanism, a page size and a branch target of a branch for instructions of a processing pipeline of the processor using a branch target buffer (BTB) to predict the branch target, said BTB storing recently used instructions close to the processor in a local cache; and tracking, by a translation look-aside buffer (TLB) that supports multiple page sizes based on branch targets that use different page sizes, translation of most recent pages translated by the processor.

11. The method of claim 10, further comprising:
using a page size for an instruction fetch comprising a different page size based on there being a branch to a function contained in a dynamically linked library;
compiling the library independently of the user program that is calling the dynamically linked library such that at different compiler times, different page sizes are used to create a caller function and a callee function which apply different page sizes; and
predicting said different page sizes ahead of time utilizing a single set associative TLB.

12. The method of claim 10, further comprising collating a prediction of a page size with branches in a branch prediction logic of the processor which is utilized by said branch multiple page size prediction mechanism such that, based on a branch and a target of the branch being predicted, the page size of the target is predicted.

13. The method of claim 12, further comprising:
utilizing for a prediction of a page size the branch prediction logic for the page predictor of the instruction fetch and the TLB; and
tracking, along with tracking content of a target address, a page size prediction in the branch multiple page size prediction mechanism such that based on a branch and a target of the branch being predicted, the page size of the target is predicted.

14. The method of claim 13, further comprising:
collating a prediction of a page size is collated with the page size of the branch target; and
acquiring by each unique cache line fetch request an instruction address registers address value which is tracked through the processing pipeline.

15. The method of claim 14, further comprising:
tracking page size information of the instruction address registers address value;
based on installing a branch into the BTB, accessing the branch and instruction address registers address value to acquire the branch and target address to be stored into the BTB;
based on accessing the instruction address registers address value, evaluating the page size of the target; and
based on a branch being predicted as taken, beyond acquiring the target address for the branch target, reporting by the BTB a page size that the target fetch uses for making instruction fetches, wherein the reported page size is assigned to an instruction address registers address value along with assigning a cache line to an instruction address registers address value such that, based on a fetch being made via instruction fetch logic to an instruction cache, it is determined which instruction address registers address value is being used to generate a fetch address which has the page size of the address, wherein the page size determines a least significant bits (LSB) of address bits that are translated, wherein a certain number of these bits are used to index the TLB.

16. The method of claim 14, wherein TLB is a two-way set associative TLB within which for each entry of the TLB there are two pieces of data, and a tag is used for a first compare for a first data set which provides a translated address of the entry.

17. The method of claim 14, further comprising decoding an instruction and examining an opcode for the instruction to determine if the instruction is a branch, and based on the instruction comprising a branch prediction marking from the instruction fetch logic, predicting a target of the branch; and
based on the branch not being predicted, classifying the branch as a surprise branch.

18. The method of claim 17, further comprising:
based on the branch being defined as a predicted taken branch, making a fetch for the predicted target by an access to the TLB defined with respect to the a page size of the predicted target;
based on the fetch being a TLB hit, determining that the page size of the predicted target is correct; and
processing a next instruction by the processor.

19. A computer program product for implementing computer processing system control for a processor having operating system (O/S) multi-task control between multiple user programs, the computer program product comprising:
a non-transitory storage medium readable by a processing circuit and storing instructions for execution by the processing circuit for performing a method comprising:
predicting, by a branch multiple page size prediction mechanism, a page size and a branch target of a branch for instructions of a processing pipeline of the processor using a branch target buffer (BTB) to predict the branch target, said BTB storing recently used instructions close to the processor in a local cache; and
tracking, by a translation look-aside buffer (TLB) that supports multiple page sizes based on branch targets that use different page sizes, translation of most recent pages translated by the processor.

20. The computer program product of claim 18, further comprising collating a prediction of a page size with branches in a branch prediction logic of the processor which is utilized by said branch multiple page size prediction mechanism such that, based on a branch and a target of the branch being predicted, the page size of the target is predicted.

* * * * *